US012771544B2

(12) United States Patent
Regmi et al.

(10) Patent No.: US 12,771,544 B2
(45) Date of Patent: Oct. 20, 2026

(54) IDENTITY RELATIONSHIP MAPPING ATTESTATION UTILITY TOKEN

(71) Applicant: Wells Fargo Bank, N.A., San Francisco, CA (US)

(72) Inventors: Ashmita Regmi, San Francisco, CA (US); Ian Timothy Staley, Seattle, WA (US); Anita Sukur, Minneapolis, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 43 days.

(21) Appl. No.: 18/670,142

(22) Filed: May 21, 2024

(65) Prior Publication Data

US 2025/0365152 A1 Nov. 27, 2025

(51) Int. Cl.
*H04L 9/32* (2006.01)

(52) U.S. Cl.
CPC .................................. *H04L 9/3213* (2013.01)

(58) Field of Classification Search
CPC ......... H04L 9/3213; H04L 9/08; G06Q 20/36; G06Q 20/40
See application file for complete search history.

(56) References Cited

U.S. PATENT DOCUMENTS

| | | | | |
|---|---|---|---|---|
| 10,977,499 | B2 * | 4/2021 | Oami | G06T 7/248 |
| 10,997,499 | B1 * | 5/2021 | Kayyoor | G06F 16/16 |
| 11,816,244 | B2 * | 11/2023 | Rao | G06Q 30/0201 |
| 2002/0042835 | A1 * | 4/2002 | Pepin | G06F 16/258 709/232 |
| 2005/0114530 | A1 * | 5/2005 | Mangalik | H04L 63/102 726/4 |
| 2006/0272031 | A1 * | 11/2006 | Ache | H04N 21/6581 348/E7.071 |
| 2013/0185325 | A1 * | 7/2013 | Schmidt | G06Q 30/0255 707/769 |

(Continued)

FOREIGN PATENT DOCUMENTS

| | | | | |
|---|---|---|---|---|
| EP | 3410337 A1 * | 12/2018 | G06F 16/986 |
| EP | 4636618 A1 * | 10/2025 | G06V 40/172 |
| WO | WO-2019191213 A1 * | 10/2019 | H04L 9/3271 |

OTHER PUBLICATIONS

Nahapetyan et al., On SMS Phishing Tactics and Infrastructure,2024 IEEE Symposium on Security and Privacy (SP), pp. 1-16 (Year: 2024).*

(Continued)

*Primary Examiner* — Abu S Sholeman
(74) *Attorney, Agent, or Firm* — SCHWEGMAN LUNDBERG & WOESSNER, P.A.

(57) ABSTRACT

Examples are directed to systems and methods that provide a token having a corresponding token identifier. The token is associated with a user and stores electronic data having a plurality of data sets associated with the user. The token is configured to interface with each of a plurality of disparate electronic platforms and map relationships of the user with ones of the plurality of disparate electronic platforms. The token can be used to identify a first data set of the plurality of data sets having data that corresponds to the data request and provide the first data set to a recipient while simultaneously masking a second data set of the plurality of data sets from the recipient.

20 Claims, 5 Drawing Sheets

(56) References Cited

U.S. PATENT DOCUMENTS

| | | | | |
|---|---|---|---|---|
| 2016/0004977 | A1* | 1/2016 | Shi | G06Q 20/123 706/12 |
| 2018/0204215 | A1* | 7/2018 | Hu | G06F 21/44 |
| 2020/0250694 | A1* | 8/2020 | Mock | G06F 16/958 |
| 2021/0029121 | A1* | 1/2021 | Kurian | H04L 63/083 |
| 2022/0043976 | A1* | 2/2022 | Picinini | G06F 16/9538 |
| 2022/0114281 | A1* | 4/2022 | Llamas Virgen | G06N 5/01 |
| 2023/0086191 | A1* | 3/2023 | Jakobsson | H04L 9/3231 705/66 |
| 2024/0220258 | A1* | 7/2024 | Zbiciak | G06F 9/30047 |

OTHER PUBLICATIONS

Nicholas Malcolm and Wei Zhao, The Timed-Token Protocol for Real-Time Communication, Jan. 1994, IEEE, pp. 35-41. (Year: 1994).*

* cited by examiner

IDENTITY RELATIONSHIP MAPPING ATTESTATION UTILITY TOKEN

BACKGROUND

Multiple users may enter data relating to the same entity at different times across different platforms. A first platform has a first system for maintaining records while a second system has a second system for maintaining records that is different and incompatible with the first system. Thus, the first platform is siloed from the second platform. Due to the first and second platform systems being different from each other, a user cannot trace relationships among data stored at the first and second platform systems. Therefore, if an entity has data stored at the first platform system and the second platform system, due to the incompatibility between the first platform system and the second platform system, the first platform is not aware of the entity having data stored at the second platform. Similarly, the second platform is not aware of the entity having data stored at the first platform.

SUMMARY

A user may have accounts on multiple platforms based on needs of the user. However, when the user desires to create the accounts, the user may have to provide the same information multiple times. This information can include personal information such as date of birth (DOB), social security number (SSN), driver's license number, and the like. Since this can be a manual process, errors can occur when the user provides personal information. Moreover, a fraudster can appropriate the personal information of a user and open accounts on different platforms without the knowledge of the user.

Therefore, what is needed is a system and method that solves the problems associated with a user having to provide the same information multiple times to disparate electronic platforms. The system and method should provide a digitized form of information associated with a user that is capable of being stored offline from disparate electronic platforms, where ones of the disparate electronic platforms may require the information.

Examples relate to a system and method that provides a digitized version of information associated with users. The digitized version of the information can be a data structure in the form of a token stored offline from disparate electronic platforms that may need to access the information at the token. The token can include relationship information the user may have with other users and with different accounts at the disparate electronic platforms. The token can also include relationship information the user may have with entities associated with the disparate electronic platforms and, for disparate electronic platforms with which the user is associated, the relationships among the disparate electronic platforms. Furthermore, the token can have relationships that the user may have with assets associated with the disparate electronic platforms.

The token can have a token identifier that can be used by one of the disparate electronic platforms to access the token. When an electronic platform receives a request from a user to create an account, the user can provide the token identifier to the electronic platform. In order to create the account, personal information for the user may be required along with information that is specific to the account at the electronic platform. The electronic platform can provide the token identifier along with a request for the personal information.

When a match is found, the electronic platform can be provided access to the token associated with the token identifier. In some instances, the electronic platform may require a subset of the data stored at the token. In examples, the token can function to limit of visibility of data stored at the token to the subset of data required by the electronic platform. Thus, data stored at the token that is not required by the electronic platform is not shared with the electronic platform.

DETAILED DESCRIPTION

Figure 1:
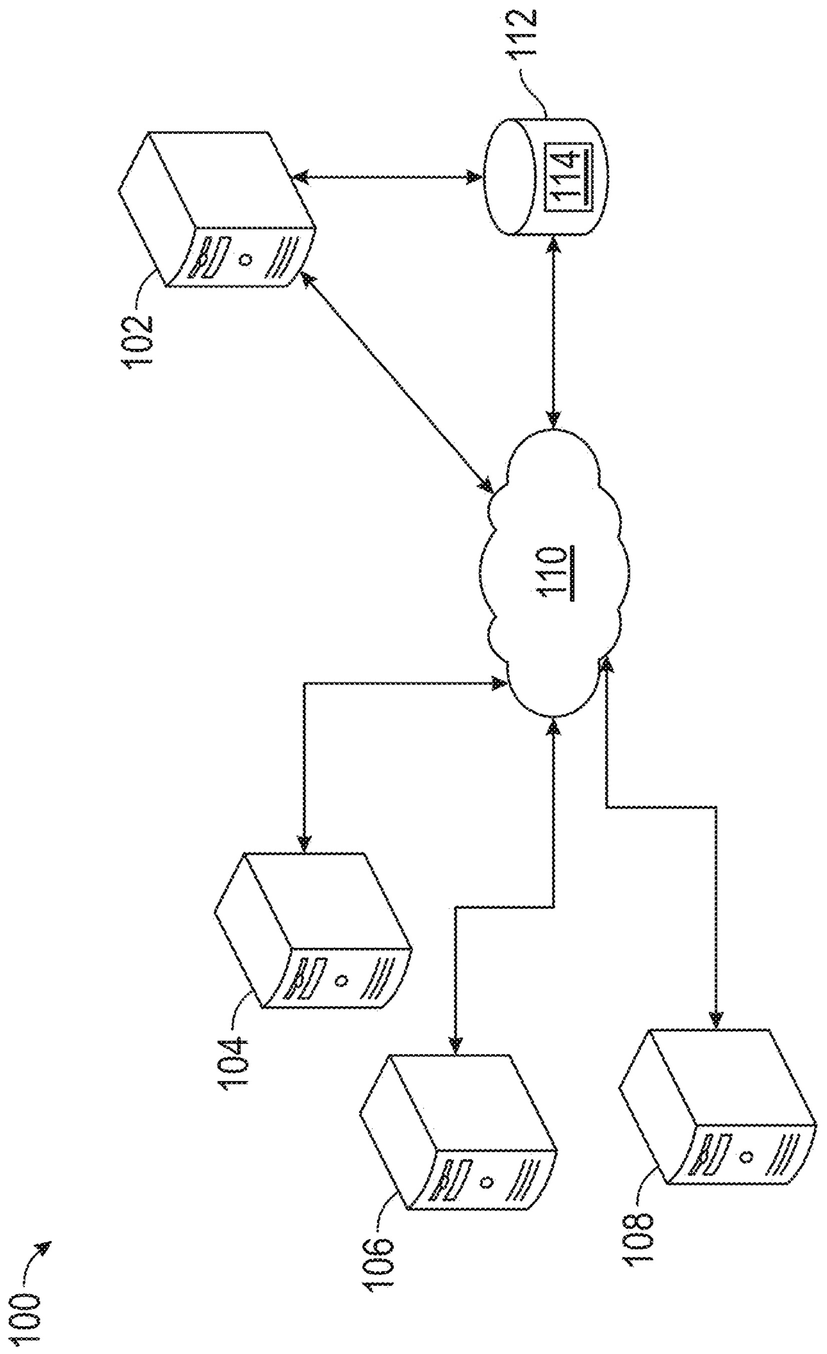
FIG. 1 shows an environment in which examples may operate, in accordance with some examples.

Examples relate to a system and method that provides a digitized version of information associated with users. The digitized version of the information can be a data structure in the form of a token stored offline from disparate electronic platforms that may need to access the information at the token. The token can include relationship information the user may have with other users and with different accounts at the disparate electronic platforms. The token can also include relationship information the user may have with entities associated with the disparate electronic platforms and, for disparate electronic platforms with which the user is associated, the relationships among the disparate electronic platforms. Furthermore, the token can have relationships that the user may have with assets associated with the disparate electronic platforms.

The token can have a token identifier that can be used by one of the disparate electronic platforms to access the token. When an electronic platform receives a request from a user to create an account, the user can provide the token identifier to the electronic platform. In order to create the account, personal information for the user may be required along with information that is specific to the account at the electronic platform. The electronic platform can provide the token identifier along with a request for the personal information.

When a match is found, the electronic platform can be provided access to the token associated with the token identifier. In some instances, the electronic platform may require a subset of the data stored at the token. In examples, the token can function to limit of visibility of data stored at the token to the subset of data required by the electronic platform. Thus, data stored at the token that is not required by the electronic platform is not shared with the electronic platform.

As an example, the token can be encrypted and stored using a storage protocol that protects the data within the token from being changed or altered for any given period of time. The token stores personal information for the user that can include data such as a SSN, a DOB, and a driver's license number.

In the example, the user has co-signed on a student loan for their child and recently applied for an auto loan. The student loan can be associated with a student loan electronic platform for a student loan line of business while the auto loan can be associated with an auto loan electronic platform for an auto loan line of business. Each of the student loan electronic platform and the auto loan electronic platform are disparate from each other and employ different communication protocols. The token can include the relationship between the user to their child, the relationship between the user and the student loan electronic platform, and the relationship between the user and the auto loan electronic platform.

Moreover, during the process of providing the student and auto loans, credit checks were performed, income verification was performed, a background check was performed, and a trust score assigned to the user based on the credit and background checks, income verification, and the amounts for the student loan and the auto loan. The results of the credit checks and the trust score can be stored in the token.

A second mortgage electronic platform can receive a data request from the user, which can include a token identifier for the token associated with the user. In the example, the electronic platform can be associated with a second mortgage line of business. Furthermore, data, such as a SSN, a DOB, and a driver's license number, can be provided by the user in order to begin the process of applying for a second mortgage. Since the token includes this information, the user does not have to provide their SSN, DOB, and driver's license number and instead only has to provide the token identifier.

When the second mortgage electronic platform receives the token identifier, the second mortgage electronic platform can forward along the token identifier to a server storing the token, which can be an offline repository. The server can store a listing of token identifiers that correspond to tokens stored at the server. In addition to providing the token identifier, the second mortgage electronic platform can also provide a request for credit and background checks, income verification, other loan balances associated with the user, and a trust score.

In the example, since the token has the requested personal information, the token can provide the personal information to the second mortgage electronic platform. Moreover, regarding the request for the credit and background checks, income verification, other loan balances associated with the user, and the trust score, since the token already has this information, the token can provide this information to the second mortgage electronic platform.

Now making reference to FIG. 1, a network environment 100 is shown in which examples can operate. The network environment 100 can include a server device 102 associated with an entity, such as a financial institution. The network environment 100 can also include electronic platforms 104-108 that can be server devices having hardware and software functionality similar to the server device 102. The electronic platforms 104-106 can be associated with various lines of businesses for the entity of the server device 102.

In addition, the electronic platforms 104-108 can be associated with different entities that have no affiliation with the entity of the server device 102 but can still exchange data with the server device 102. The entities can include a financial institution, a mortgage lender, a third-party credit card entity, a third-party student loan lender, and an auto loan lender. The entities can also include bank accounts, social media accounts, instruments that facilitate certain actions, such as an automatic bill-pay instrument, and other users, such as friends and acquaintances of a user associated with a token. For example, while the server device 102 could be associated with a financial institution, the electronic platform 104 could be associated with a mortgage lender, the electronic platform 106 could be associated with a third-party credit card entity, and the electronic platform 108 could be associated with a third-party student loan lender.

Each of the electronic platforms 104-108 can operate with a communication protocol that is different from each other and with a communication protocol used by the server device 102. Examples of different communication protocols can include any system of rules that allows for communication between two or more entities such as the various Internet protocol suites, binary, text-based including file transfer protocol (FTP), simple mail transfer protocol (SMTP) and the like.

The server device 102 and the electronic platforms 104-108 can incorporate an architecture that facilitates operation in the capacity of either a server or a client machine in server-client network environments, where each of these devices may be implemented as any type of computing device, such as a server computer, a personal computer (PC), or the like each having a processor configured to perform the subject matter disclosed herein.

The network environment 100 can also include a network 110 along with a database 112 that can be internal or external to the server device 102. The network 110 can facilitate communication between the server device 102, the devices 104-108, and the database 112.

The database 112 can be any data storage resource and may store data structured as a text file, a table, a spreadsheet, a relational database (e.g., an object-relational database), a triple store, a hierarchical data store, or any suitable combination thereof. Moreover, the server device 102 and the database 112 can be combined into a single machine, database, or device, and the functions described herein for any single machine, database, or device may be subdivided among multiple machines, databases, or devices.

The network 110 can be any network that enables communication between or among machines, databases, and devices (e.g., the server device 102, the electronic platforms 104-108, and the database 112). The network 110 can be a wired network, a wireless network (e.g., a mobile or cellular network), or any suitable combination thereof. The network 110 may include one or more portions that constitute a private network, a public network (e.g., the Internet), or any suitable combination thereof. Accordingly, the network 110 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 110 can communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

The server device 102 can also have access to a token 114 stored offsite from the server device 102 and electronic platforms 104-108 at the database 112. While not shown, the token 114 can be stored locally at the server device 102. The token 114, which can be encrypted, can be compatible with infrastructure employed by the server device 102, such as if the server device 102 is used by a financial institution and the financial institution uses a particular type of enterprise infrastructure. The database 112 can correlate to any type of persistent storage means and can comprise an immutable ledger that is sharable among computing devices. Examples can include a blockchain or a distributed ledger. Accordingly, the token 114 can be a non-fungible token (NFT) where metadata can be stored thereon. The metadata can correlate to relational information, which will be discussed in greater detail further on. The token 114 can also be dynamic (dNFT) where the token 114 can adapt and change, such as changes in relational information. In examples where the token 114 is a blockchain-based token, the token 114 can have the benefits of information sharing and ownership tracking. Moreover, in some examples, the token can be tamperproof, transparent, immutability, and auditable. In further examples, the token 114 can be associated with a knowledge graph that supports relationships between various objects within the knowledge graph, such as a graphical database.

The token 114 can be a digital representation of information saved in a format that allows for communication with the electronic platforms 104-108 regardless of the communication protocols implemented by each of the electronic platforms 104-108. Thus, if each of the electronic platforms 104-108 use three disparate communication protocols, the token 114 can communicate with each of the electronic platforms 104-108. The token 114 can implement the inter-blockchain protocol or any other type of protocol capable of handling authentication and transport of data between blockchains. In addition, the token 114 can implement a communication protocol and/or functionality that can facilitate the ability of the token 114 to communicate with disparate communication protocols.

While only a single token 114 is shown in the Figures, examples where the network environment 100 and the server device 102 have multiple tokens are envisioned. Furthermore, the discussion herein with respect to the functionality of the token 114 and operations that can be performed with the token 114 are applicable to the multiple tokens that can be resident in the network environment 100.

Figure 2:
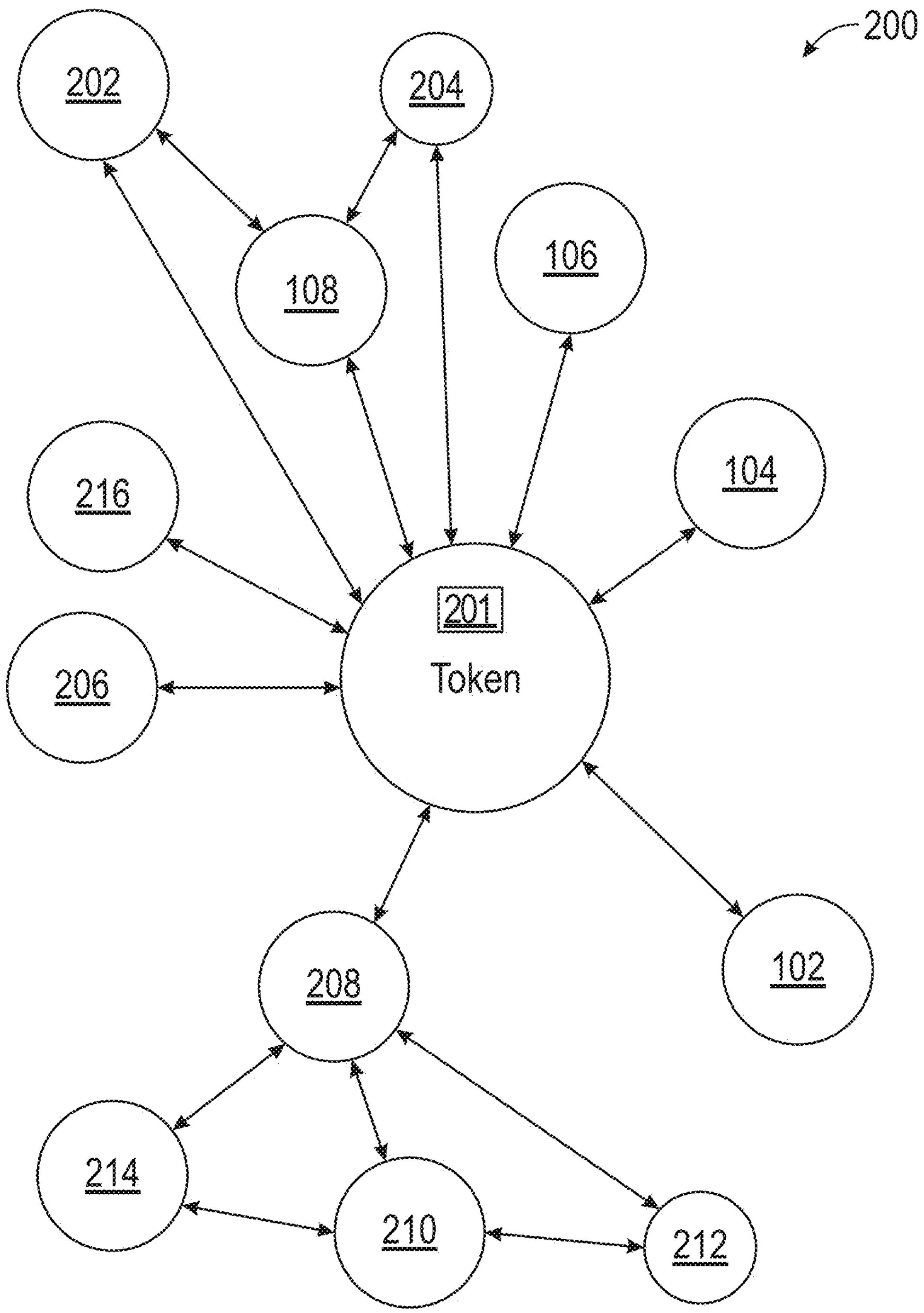
FIG. 2 illustrates relational information accessible by a token of the network environment of FIG. 1, in accordance with some examples.

In addition to the personal information mentioned above, the token 114 can store relational information 200 as shown with reference to FIG. 2. The token 114 can be integrated with the server device 102 and operate to fetch data, such as the relational information 200. When a data request is received from an electronic platform, such as any of the electronic platforms 104-108, the relational information 200 can be used to provide the requested information.

The token 114 can store the relational information 200 in the form of electronic data corresponding to relationships between a user, an electronic platform, and another user, such as a knowledge graph. In the instance when the electronic platform 108 is a third-party student loan lender, the relational information 200 can show the relationship between the user (the user can be represented by the token and a token identifier 201 in FIG. 2) and the electronic platform 108, a relationship between the user and a child 202 of the user, and a relationship between the child 202 and an account corresponding to a student loan at the electronic platform 108. More specifically, the relational information 200 can show that both the user and the child 202 share a same account with the electronic platform 108, which, in this scenario, can be that the user is a co-signer of a student loan for the child 202. In instances where the child 202 and the user share multiple accounts at multiple electronic platforms, such as accounts at the mortgage lender electronic platform 104 and the third-party credit card electronic platform 106, these relationships can also be shown in the relational information 200.

The relational information 200 can also show relationships among different entities, such as different electronic platforms. If the user associated with the token 114 has co-signed a student loan for their child 202, the user may be using autopay from a higher education savings account electronic platform 204, which can be an electronic platform, to make payments on the student loan at the electronic platform 108. The relational information 200 can show the relationship between the electronic platform 108 and the higher education savings account electronic platform 204.

The relational information 200 can also illustrate that the token 114 has information from a fraud alert electronic platform 206. The fraud alert electronic platform 206 can include a listing of users having associated accounts on which a fraud alert has been placed. Thus, if a fraudster has attempted to fraudulently open accounts in the name of a user at one of the electronic platforms, a flag may be set for a listing such as accounts associated with the that user. For example, a flag for the user associated with the token 114 can be set if a fraud determination has occurred at a time $T_1$ for an account of the user associated with the token 114 on account of a data breach. At a time $T_2$ after the time $T_1$, as a result of the data breach, a fraudster attempts to open a credit card at the electronic platform 106 using the information of the user associated with the token 114. When the electronic platform 106 provides the token identifier, based on the relational information 200, the token 114 will return information to the electronic platform 106 that a flag has been set for the user associated with the token 114 indicating fraud. Thus, the electronic platform 106 will not open a credit card account for the fraudster and instead the fraudster will be denied.

Moreover, the relational information 200 can show relationships between the user associated with the token 114 and assets stored at electronic platforms. The user associated with the token 114 can have an account at a bank account electronic platform 208, which can be shown with the relational information 200. This relationship can be used to evaluate risk for the user associated with the token 114, such as if the user regularly overdrafts the bank account associated with the bank account electronic platform 208. Furthermore, if the user is typically late on making payments to the electronic platform 108 for the student loan, this information can be captured with the relational information 200. This information can be used to assess a risk score for the user associated with the token 114.

As shown in FIG. 2, the bank account electronic platform 208 can have a relationship with another a third-party credit card electronic platform 210. A balance for a credit card issued by the third-party credit card electronic platform 210 can be paid from the bank account electronic platform 208. Information associated with how regularly the user associated with the token 114 pays a balance at the third-party credit card electronic platform 210 can further be used for risk assessment.

The relational information 200 can show that a second child 212 and a spouse 214 of the user associated with the token 114 also have access to the third-party credit card electronic platform 210. Therefore, the relational information 200 can show that the user associated with the token 114 has a relationship with the second child 212 and the spouse 214. The relational information 200 can illustrate that the second child 212 and the spouse 214 also have access to the bank account at the bank account electronic platform 208.

The relational information 200 can also include a user profile electronic platform 216 of the user associated with the token 114. The user profile electronic platform 216 can include profile data associated with the user associated with the token 114. The user profile electronic platform 216 can include the aforementioned flag that is set when fraud may have occurred with the accounts of the user associated with the token 114. The user profile electronic platform 216 can also have store trust scores for the user associated with the token 114. The trust scores can be based on a credit history of the user associated with the token 114, such as any delinquencies the user associated with the token 114 may have. The delinquencies can include missed payments, late payments, and the like, which can be used to determine trust scores. The trust score can also be a function of the amount of credit extended to the user associated with the token 114 in relation to the number of assets held by the user associated with the token 114. The trust scores can also be used to calculate a risk assessment score of the user associated with the token 114. The risk assessment score can also be stored with the user profile electronic platform 216.

The user profile electronic platform 216 can also have demographic data for the user associated with the token 114. The demographic data can include an age, educational background, and a professional licensure history of the user associated with the token 114. The demographic data can also include volunteer experience of the user associated with the token 114.

The relational information 200 can change over time, such as if a user associated with the token 114 becomes affiliated with additional electronic platforms, is no longer affiliated with an existing electronic platform in the relational information 200, or the like. Changes can also include the user associated with the token 114 establishing new relationships with new electronic platforms, new users, new accounts, or if electronic platforms of the user associated with the token 114 become associated with other electronic platforms or disassociate with electronic platforms. By virtue of being a dNFT, the token 114 can adapt to the changes in the relational information 200.

Accordingly, the token 114 and the relational information 200 stored by the token 114 can provide many benefits. Since the token 114 includes personal information for a user associated with the token 114, a user making a request does not have to repeatedly provide this information to electronic platforms, thereby reducing manual processes associated with requesting services provided by electronic platforms. Moreover, a user associated with the token 114 does not have to repeatedly provide personal information to various electronic platforms, which can enhance security, such as if a fraudster intercepts communications between the user associated with the token 114 and the electronic platform to which the user associated with the token 114 is providing personal information.

The token 114 can also leverage an on-chain data storage that can utilize different storage protocols and primitives and present the different storage protocols and primitives as a single user interface. The on-chain data storage can implement smart contract techniques in order to automate execution without intermediary involvement. Smart contract techniques can be used for information sharing amongst entities such as electronic platforms, tracking illicit activities of electronic platforms and a user associated with the token 114, and can predict behavior and data that a data requestor may need but has not necessarily requested. With smart contract techniques, the token 114 can ensure fair credit lending and decrease times associated with opening accounts.

The token 114 and relational information 200 can also improve the functioning of computing devices implementing the token 114. More specifically, the speed with which processes associated with electronic platforms providing services to a user associated with the token 114 are increased since access to information, such as personal information, fraud alerts, risks assessments, other accounts for which the user associated with the token 114 has relationships, and the like can easily and quickly be determined. The functioning of computing devices is further improved by virtue of the token 114 having a protocol that can be used with electronic platforms having a variety of protocols that can differ among the electronic platforms and with the token 114.

Figure 3:
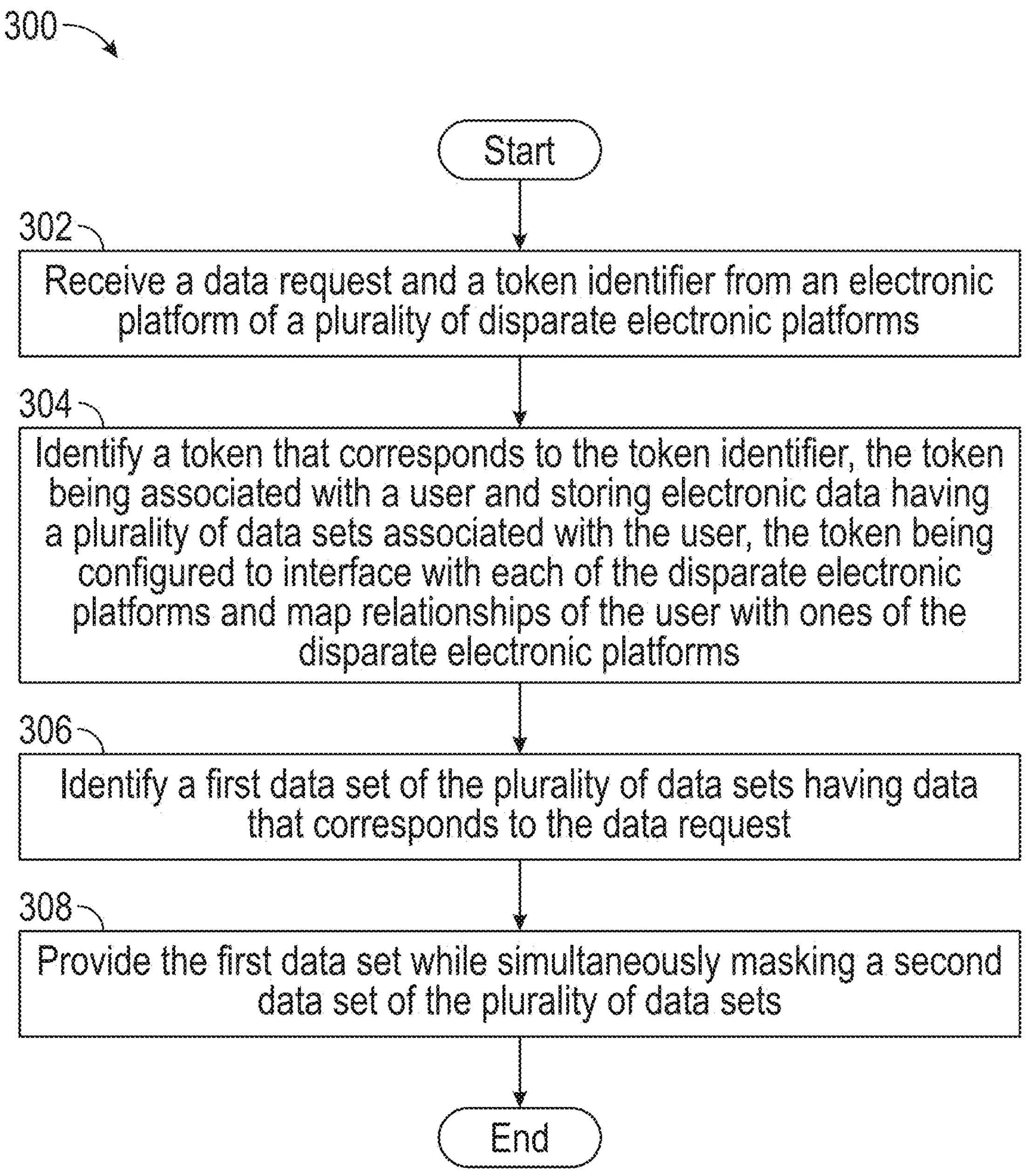
FIG. 3 shows a method of using a token to access the relational information shown in FIG. 2, in accordance with some examples.

Now making reference to FIG. 3, a method 300 of using a token is described. Initially, during an operation 302, a data request and a token identifier from an electronic platform of a plurality of electronic platforms is received. The request can be related to a request that the electronic platform receives from a user, as described above. When the user provides the request, the user can also provide the token identifier that corresponds to a token associated with the user.

In response to receiving the request and the token identifier, the method performs an operation 304, where a token that corresponds to the token identifier is identified. The token can be associated with the user and store electronic data having a plurality of data sets associated with the user. The plurality of data sets can include the relational information 200 described above where the data sets can be the electronic platforms 204-210 and 216. The plurality of data sets can also include the children 202 and 212 and the spouse 214 of the user.

In examples, the token can be stored at the server device and be configured to communicate with disparate electronic platforms. As discussed above, the token can have a token communication protocol while the electronic platforms can have a plurality of communication protocols that are disparate and distinct from each other and/or disparate and distinct from the token communication protocol. Furthermore, as discussed above, the token communication protocol can communicate with each of the disparate and distinct communication protocols associated with the electronic platforms. The token can also map relationships of the user associated with the token with ones of the electronic platforms. Thus, in some examples, the token can have functionality that is different from a traditional token since the token can have communication capabilities along with machine learning model capabilities as discussed herein. An example of this mapping is shown and discussed above with reference to FIG. 2 and the relational information 200.

As an illustration of the method 300 and referred to herein as "the illustration," a user TonyJ may be a customer with a financial institution represented by the server device 102, such as Wells Fargo™. The user TonyJ desires to open a home equity line of credit (HELOC) with a line of business owned by Wells Fargo™. In the illustration, the line of business can be a mortgage lender that is implemented by the mortgage lender electronic platform 104. Therefore, in the illustration, the user TonyJ provides a request to open a HELOC with the mortgage lender electronic platform 104. In addition, the user TonyJ provides the token identifier 201.

The mortgage lender electronic platform 104 may require certain information in order to open the HELOC for the user TonyJ. This information can include personal information for the user TonyJ, a trust score, a risk assessment, and any outstanding loans that the user TonyJ may have. During the operation 302, the mortgage lender electronic platform 104 provides a data request along with the token identifier 201 to the server device 102. The data request can include a request for risk assessment data and any outstanding loans that the user TonyJ may have.

In the illustration, during the operation 304, the server device 102 determines that the token 114 corresponds to the token identifier 201. The server device 102 also identifies the relational information 200 as being associated with the token 114, where the relational information 200 includes the various data sets as described above. The relational information 200 also includes the children 202 and 212 of the user TonyJ, KennedyJ and MacJ, and the spouse 214, JaneanneJ, of the user TonyJ, and provides a mapping of the electronic platforms 204-210 and 216 along with the children 202 and 212 and the spouse 214.

Returning to FIG. 3 and the method 300, after the operation 304, the method 300 can perform an operation 306. During the operation 306, a first data set of the plurality of data sets that have data corresponding to the data request can be identified. As an example, if the data request is for information relating to outstanding credit card balances and bank balances for the user associated with the token in relation to a request to open a new credit card, credit card and bank balances for the user associated with the token based on relational information associated with the token can be determined.

After identifying the first data set during the operation 306, the method 300 can perform an operation 308, where the first data set can be provided to the requestor while simultaneously masking a second data set of the plurality of data sets. In other examples, the second data set can be masked and the first data then provided to the requestor. In particular, either the token or a device presenting data from the token can mask data sets in the plurality of data sets that do not include data associated with the data request. For example, if the relational information of the token includes bank account electronic platforms and others associated with the user who have access to the bank account holding a bank balance, such as a spouse or a child, this information may not be necessary to open a new credit card. Thus, during the operation 308, the data related to others who have access to bank accounts holding bank balances can be shielded when the token or data associated with the token is provided. By virtue of masking, a recipient of the data set will not have full visibility into the data set. Instead, the recipient will only have visibility into data subsets of the data sets. The token 114 can include a machine learning model that can be trained to discern which data subsets of the data sets should be masked when providing data sets. Moreover, the machine learning model can be trained over time with different training data sets to reflect changing patterns in data subsets that should be masked or should subsequently be provided that were previously masked based on changes that can happen over time.

Returning to the illustration, during the operation 306, since the mortgage lender electronic platform 104 requested personal information for the user TonyJ, the relational information 200 that includes the SSN, the DOB, and the driver's license number for the user TonyJ is identified during the operation 306. Furthermore, the mortgage lender electronic platform 104 requested a trust score and a risk assessment for the user TonyJ and any outstanding loans that the user TonyJ may have. Accordingly, the user profile electronic platform 216 that includes a trust score and a risk assessment score for the user TonyJ along with the third-party credit card electronic platform 106 and the third-party student loan electronic platform 108 are identified as data sets. Here, the third-party student-loan electronic platform 108 also indicates that the child 202, KennedyJ, is a co-signor on the student loan at the third-party student loan electronic platform 108.

The operation 308 is then performed where the SSN, the DOB, and the driver's license number for the user TonyJ is provided to the mortgage lender electronic platform 104. Additionally, the data sets from the user profile electronic platform 216 relating to a trust score and risk assessment is provided. However, demographic data of the user TonyJ will be masked since the demographic data was not requested and instead only the risk assessment is provided during the operation 308. The data sets corresponding to the third-party credit card electronic platform 106 and the third-party student loan electronic platform 108 are also presented. However, the data relating to the child, KennedyJ, being a co-signor on the student loan will be masked when the data sets are provided during the operation 308.

The token 114 can include a machine learning model which can be used to create and update data sets, such as those in the relational information 200 along with masking data sets. The machine learning model can include a knowledge base having contextual datasets that can be accessed to categorize an item using the item data and identify keys. Training data can be provided to the machine learning model to train the machine learning model how to categorize an item based on the item data. The machine learning model can include any type of deep learning algorithm that can perform various natural language processing tasks, such as a large language model. Examples can include Chat Generative Pre-trained Transformer (ChatGPT), Pathways Language Model (PaLM), Large Language Model Meta AI (LLaMA), BigScience Large Open-science Open-access Multilingual Language Model (BLOOM), or the like. Further examples of machine learning models that can be used can include Classification and Regression Training, gradient boosted machines, glmnet, randomForest, SciPy, XGBoost, and various neural networks, such as a Feed-Forward neural network, a radial basis function neural network, a multilayer perceptron neural network, a convolutional neural network, a recurrent neural network, and a modular neural network.

The machine learning model can use deep learning to output text through transformer neural networks. The machine learning model can be provided ground rules and then be provided data, such as previous feedback provided from users. In an unsupervised format, the machine learning model can train to develop an understanding of the relationships objects in the item data having a key:value format and nodes in the hierarchical nodal structure. The machine learning model can include a LLM and more specifically an attention model. The training data can be tagged based on a desired categorization of the first item associated with an input, such as a title for the first item.

The machine learning model can be trained to mask data sets as described herein. The machine learning model employ zero-knowledge proof techniques/standards in order to mask data sets, such as personal information.

The machine learning model used to create and update data sets can change over time. The machine learning model can be provided with a first training data set at a first time $T_1$ to create data structures having data sets for the user associated with the token 114 such as the data sets associated with the relational information 200. Over time, such as a time $T_2$ that is after the time $T_1$, a determination can be made that changes, such as a data requirement changes, should be made to the machine learning model. The determination can be made based on the quality of the data sets that are being provided as discussed above.

For example, a determination can be made that the machine learning model is providing data sets that should be masked based on the training data received during the time period $T_1$ and the machine learning model generated at the time $T_1$. Training data corresponding to second data sets that should be masked can be provided at the time $T_2$. The training data provided at the time $T_2$ can be used to update the machine learning model and change the machine learning model at time $T_2$ in comparison to the machine learning model at the time $T_1$.

Similarly, a determination can be data sets are not being provided should be provided with the machine learning model based on the training data received during the time period $T_1$ and the machine learning model generated at the time $T_1$. Training data corresponding to data sets that should be provided can be provided at the time $T_2$. The training data provided at the time $T_2$ can be used to update the machine learning model and change the machine learning model at time $T_2$ in comparison to the machine learning model at the time $T_2$.

The token described herein can be transferred from a first user to a second user. Moreover, the token can be reused multiple times. For example, if the user desires to apply for a third-party credit card using the electronic platform 106 after applying for a mortgage using the electronic platform 104, the token 114 can be used for the subsequent third-party credit card application. Accordingly, there are no limits to the number of times the token 114 can be used for different entities, such as the electronic platforms 104-108, 206, and 208. Thus, the token 114 can provide data from a plurality of data sets in response to multiple data requests.

In addition, the token can be updated with additional data sets. Thus, if personal information for the user associated with the token 114 changes, such as getting a new driver's license with a new driver's license number, or if the user associated with the token 114 has additional children, these additional data sets can be added to the token 114. In the instance of getting a new driver's license number, the data set associated with the old driver's license number can be replaced with the data set associated with the new driver's license number such that the data sets of the relational information 200 are replaceable and updatable. Moreover, these additional data sets can be received from the different electronic platforms 104-108, 206, and 210.

Figure 4:
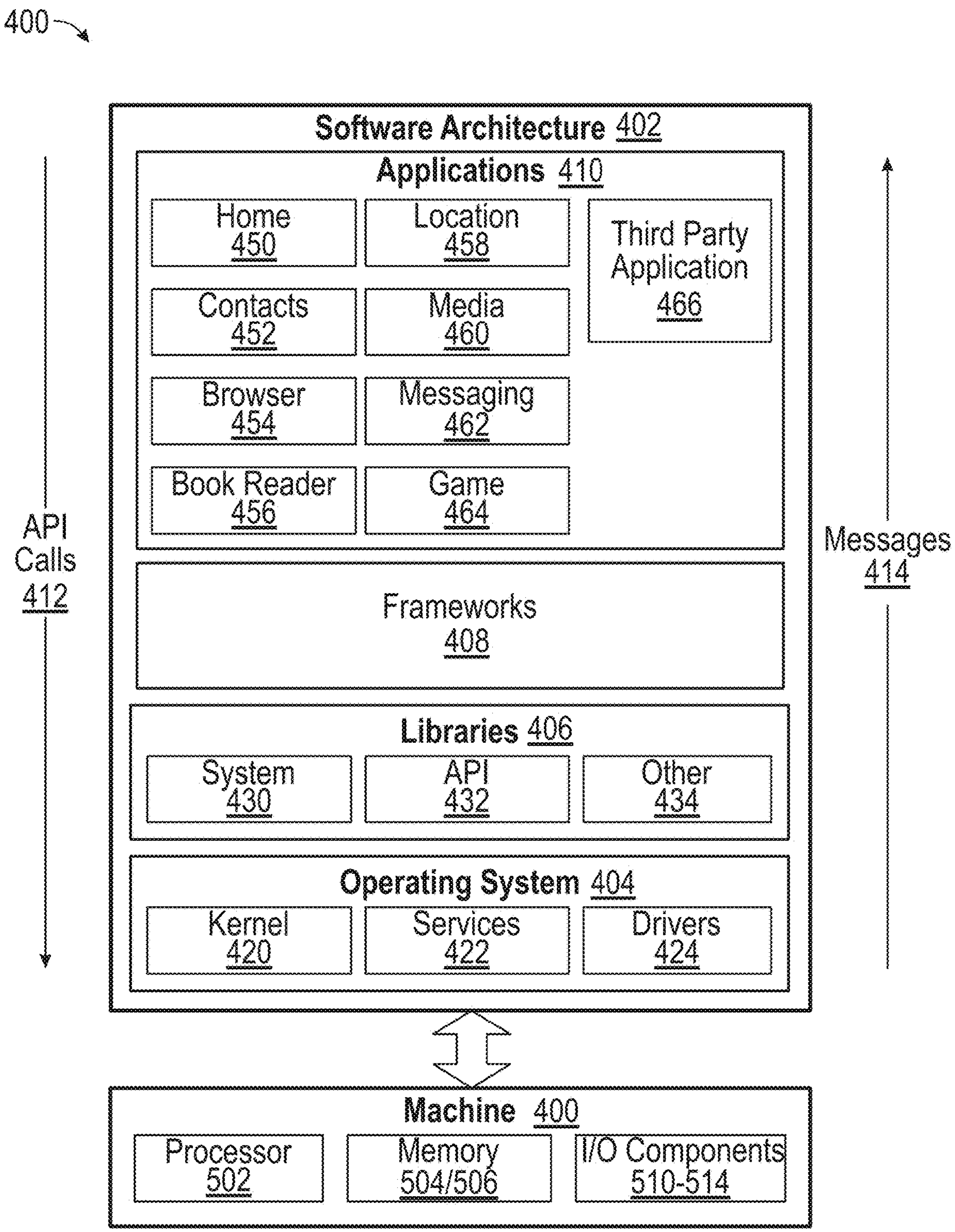
FIG. 4 is a block diagram illustrating an example of a machine upon which one or more examples may be implemented.

FIG. 4 is a block diagram 400 illustrating a software architecture 402, which may be installed on any one or more of the devices described above. FIG. 4 is merely a non-limiting example of a software architecture, and it will be appreciated that many other architectures may be implemented to facilitate the functionality described herein. The software architecture 402 may be implemented by hardware such as a computer system 500 of FIG. 5 that includes a processor 502, memory 504 and 506, and I/O components 510-514. In this example, the software architecture 402 may be conceptualized as a stack of layers where each layer may provide a particular functionality. For example, the processor 502 includes layers such as an operating system 404, libraries 406, frameworks 408, and applications 410. Operationally, the applications 410 invoke application programming interface (API) calls 412 through the software stack and receive messages 414 in response to the API calls 412, according to some implementations.

In various implementations, the operating system 404 manages hardware resources and provides common services. The operating system 404 includes, for example, a kernel 420, services 422, and drivers 424. The kernel 420 acts as an abstraction layer between the hardware and the other software layers in some implementations. For example, the kernel 420 provides memory management, processor management (e.g., scheduling), component management, networking, and security settings, among other functionality. The services 422 may provide other common services for the other software layers. The drivers 424 may be responsible for controlling or interfacing with the underlying hardware. For instance, the drivers 424 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 406 provide a low-level common infrastructure that may be utilized by the applications 410. The libraries 406 may include system libraries 430 (e.g., C standard library) that may provide functions such as memory allocation functions, string manipulation functions, mathematic functions, and the like. In addition, the libraries 406 may include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 may also include a wide variety of other libraries 434 to provide many other APIs to the applications 410.

The frameworks 408 provide a high-level common infrastructure that may be utilized by the applications 410, according to some implementations. For example, the frameworks 408 provide various graphic user interface (GUI) functions, high-level resource management, high-level location services, and so forth. The frameworks 408 may provide a broad spectrum of other APIs that may be utilized by the applications 410, some of which may be specific to a particular operating system or platform.

In an example, the applications 410 include a home application 450, a contacts application 452, a browser application 454, a book reader application 456, a location application 458, a media application 460, a messaging application 462, a game application 464, and a broad assortment of other applications such as a third-party application 466. According to some examples, the applications 410 are programs that execute functions defined in the programs. Various programming languages may be employed to create one or more of the applications 410, structured in a variety of manners, such as object-orientated programming languages (e.g., Objective-C, Java, or C++) or procedural programming languages (e.g., C or assembly language). In a specific example, the third-party application 466 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 466 may invoke the API calls 412 provided by the mobile operating system (e.g., the operating system 404) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 110 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

Figure 5:
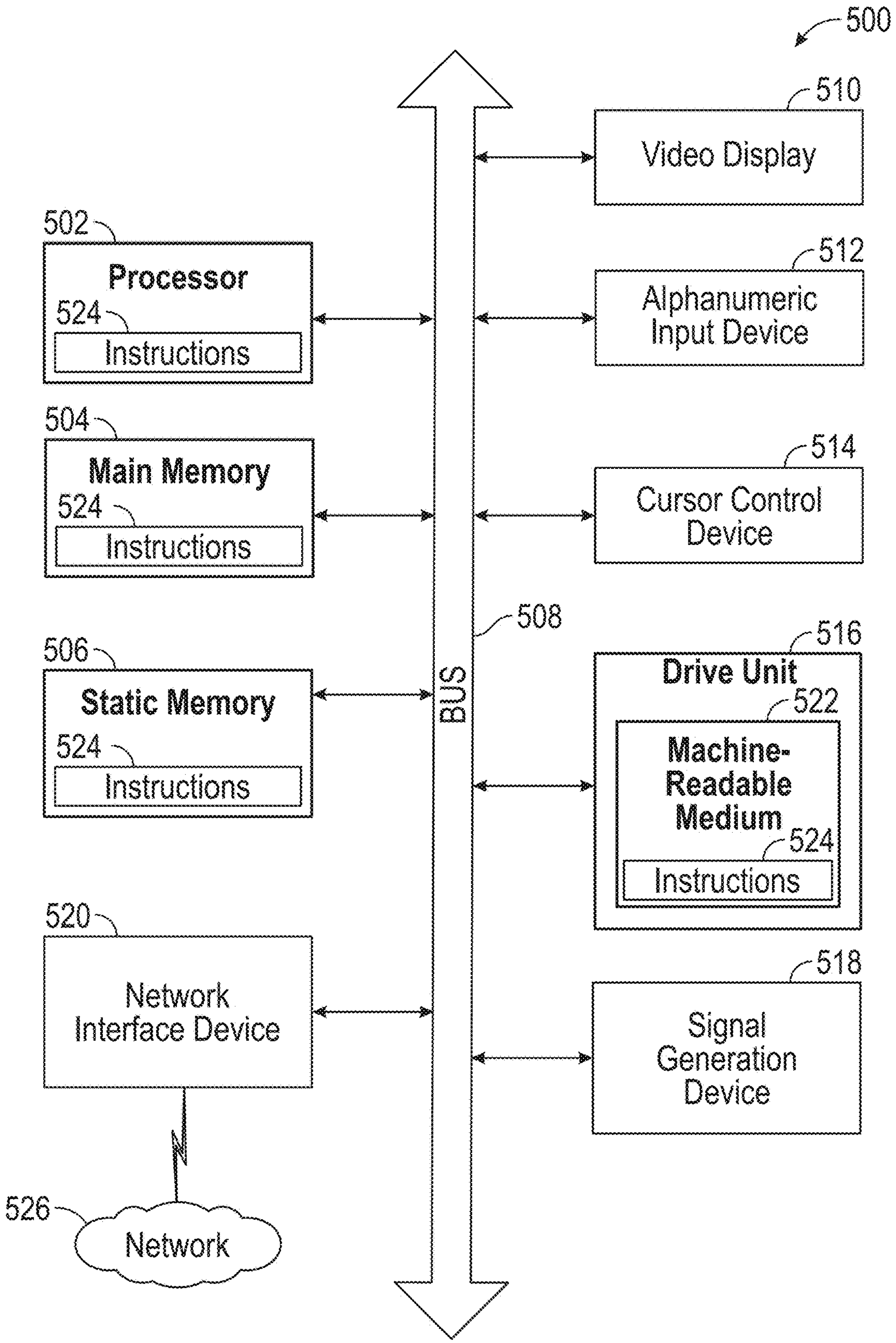
FIG. 5 illustrates a device that can be used to implement exemplary examples of the present disclosure.

FIG. 5 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 500 includes a processor 502 (e.g., a central processing unit (CPU), a graphics processing unit (GPU), processing circuitry, or any combination thereof), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device (cursor control device) 514 (e.g., a mouse), a disk drive unit 516, a signal generation device 518 (e.g., a speaker) and a network interface device 520.

The drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media. The instructions 524 may also reside within the static memory 506.

While the machine-readable medium 522 is shown in an example to be a single medium, the term "machine-readable medium" may include a single medium or multiple media (e.g., a centralized or distributed database, and/or associated caches and servers) that store the one or more instructions or instructions 524. The term "machine-readable medium" shall also be taken to include any tangible medium that is capable of storing, encoding or carrying the instructions 524 for execution by the machine and that cause the machine to perform any one or more of the methodologies of the present invention, or that is capable of storing, encoding or carrying data structures utilized by or associated with such instructions 524. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 524 for execution by the machine, and includes digital or analog communications signals or other intangible media to facilitate communication of such software.

In various example examples, one or more portions of the network 526 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 526 or a portion of the network 526 may include a wireless or cellular network, and a coupling may be a Code Division Multiple Access (CDMA) connection, a Global System for Mobile communications (GSM) connection, or another type of cellular or wireless coupling. In this example, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
processing circuitry; and
a memory device including instructions stored thereon, wherein the instructions, which when executed by the processing circuitry, configure the processing circuitry to perform operations that:
receive a data request and a token identifier from an electronic platform of a plurality of disparate electronic platforms, wherein the data request is associated with a user requesting creation of an account at the electronic platform;
identify a token that corresponds to the token identifier, the token being associated with the user and storing electronic data having a plurality of data sets associated with the user, the plurality of data sets including information associated with the user and relational information mapping relationships of the user with ones of the plurality of disparate electronic platforms, and relationships between the user and accounts at the plurality of disparate electronic platforms, wherein the token is configured to:
interface with each of the plurality of disparate electronic platforms using a token communication protocol that communicates with different communication protocols employed by each of the plurality of disparate electronic platforms; and
map the relationships of the user with ones of the plurality of disparate electronic platforms;
identify a first data set of the plurality of data sets having data that corresponds to the data request; and
provide the first data set to the electronic platform while masking a second data set of the plurality of data sets to limit visibility of data stored at the token to a subset of data such that the electronic platform only views data relevant for the data request, wherein the token is stored on an immutable ledger and the token comprises a non-fungible token having metadata corresponding to the relational information.

2. The system of claim 1, wherein each of the plurality of disparate electronic platforms have different communication protocols.

3. The system of claim 1, wherein the relationships further include;
relationships between the user and other users;
relationships between the user and accounts associated with the user at the plurality of disparate electronic platforms;
relationships between a first electronic platform of the plurality of disparate electronic platforms and a second electronic platform of the plurality of disparate electronic platforms; and
relationships between the user and assets stored at the plurality of disparate electronic platforms.

4. The system of claim 1, wherein the token is configured to provide the electronic data from the plurality of data sets in response to multiple data requests.

5. The system of claim 1, wherein the token includes a machine learning model configured to create the plurality of data sets and the processing circuitry is further configured to perform operations that:
provide a first set of training data to the machine learning model, the first set of training data training the machine learning model to create the plurality of data sets at a first time interval; and
provide a second set of training data to the machine learning model, the second set of training data training the machine learning model to update the plurality of data sets at a second time interval in response to data requirement changes for the token, where the second set of training data causes the machine learning model to change over time between the first time interval and the second time interval such that the token changes over time based on the machine learning model changing over time between the first time interval and the second time interval.

6. The system of claim 1, wherein the processing circuitry is further configured to perform operations that:

receive additional data sets from the plurality of disparate electronic platforms; and update the token with the additional data sets.

7. The system of claim 1, wherein the processing circuitry is further configured to perform operations that:

receive a third data set of the plurality of data sets; and replace the first data set of the plurality of data sets with the third data set of the plurality of data sets.

8. The system of claim 1, wherein the processing circuitry is further configured to perform operations that:

access a listing relating to fraudulent activity occurring at one of the plurality of disparate electronic platforms using the token; and deny the data request based on the listing relating to fraudulent activity occurring at one of the plurality of disparate electronic platforms.

9. The system of claim 1, wherein the token is stored offsite from the plurality of disparate electronic platforms.

10. The system of claim 9, wherein the token is encrypted and stored on one of a blockchain, a distributed ledger, or a graphical database.

11. A non-transitory, machine-readable medium, comprising instructions, which when performed by a processor of a machine, causes the processor to perform operations to:

receive a data request and a token identifier from an electronic platform of a plurality of disparate electronic platforms, wherein the data request is associated with a user requesting creation of an account at the electronic platform;

identify a token that corresponds to the token identifier, the token being associated with the user and storing electronic data having a plurality of data sets associated with the user, the plurality of data sets including information associated with the user and relational information mapping relationships of the user with ones of the plurality of disparate electronic platforms, and relationships between the user and accounts at the plurality of disparate electronic platforms, wherein the token is configured to:

interface with each of the plurality of disparate electronic platforms using a token communication protocol that communicates with different communication protocols employed by each of the plurality of disparate electronic platforms; and map the relationships of the user with ones of the plurality of disparate electronic platforms;

identify a first data set of the plurality of data sets having data that corresponds to the data request; and provide the first data set to the electronic platform while masking a second data set of the plurality of data sets to limit visibility of data stored at the token to a subset of data such that the electronic platform only views data relevant for the data request, wherein the token is stored on an immutable ledger and the token comprises a non-fungible token having metadata corresponding to the relational information.

12. The non-transitory, machine-readable medium of claim 11, wherein each of the plurality of disparate electronic platforms have different communication protocols.

13. The non-transitory, machine-readable medium of claim 11, wherein the relationships further include:

relationships between the user and other users;

relationships between the user and accounts associated with the user at the plurality of disparate electronic platforms;

relationships between a first electronic platform of the plurality of disparate electronic platforms and a second electronic platform of the plurality of disparate electronic platforms; and relationships between the user and assets stored at the plurality of disparate electronic platforms.

14. The non-transitory, machine-readable medium of claim 11, wherein the token includes a machine learning model configured to create the plurality of data sets and the processor is further configured to perform operations that:

provide a first set of training data to the machine learning model, the first set of training data training the machine learning model to create the plurality of data sets at a first time interval; and provide a second set of training data to the machine learning model, the second set of training data training the machine learning model to update the plurality of data sets at a second time interval in response to data requirement changes for the token, where the second set of training data causes the machine learning model to change over time between the first time interval and the second time interval such that the token changes over time based on the machine learning model changing over time between the first time interval and the second time interval.

15. The non-transitory, machine-readable medium of claim 11, wherein the instructions further cause the processor perform operations to:

receive additional data sets from the plurality of disparate electronic platforms;

update the token with the additional data sets;

receive a third data set of the plurality of data sets; and replace the first data set of the plurality of data sets with the third data set of the plurality of data sets.

16. The non-transitory, machine-readable medium of claim 11, wherein the instructions further cause the processor perform operations to:

access a listing relating to fraudulent activity occurring at one of the plurality of disparate electronic platforms using the token; and deny the data request based on the listing relating to fraudulent activity occurring at one of the plurality of disparate electronic platforms.

17. The non-transitory, machine-readable medium of claim 11, wherein the token is:

configured to provide the electronic data from the plurality of data sets in response to multiple data requests;

stored offsite from the plurality of disparate electronic platforms; and encrypted and stored on one of a blockchain, a distributed ledger, or a graphical database.

18. A method comprising:

receiving a data request and a token identifier from an electronic platform of a plurality of disparate electronic platforms, wherein the data request is associated with a user requesting creation of an account at the electronic platform;

identifying a token that corresponds to the token identifier, the token being associated with the user and storing electronic data having a plurality of data sets associated with the user, the plurality of data sets including information associated with the user and relational information mapping relationships of the user with ones of the plurality of disparate electronic platforms, and relationships between the user and accounts at the plurality of disparate electronic platforms, wherein the token is configured to:

interface with each of the plurality of disparate electronic platforms using a token communication protocol that communicates with different communication protocols employed by each of the plurality of disparate electronic platforms; and map the relationships of the user with ones of the plurality of disparate electronic platforms, identifying a first data set of the plurality of data sets having data that corresponds to the data request; and providing the first data set to the electronic platform while masking a second data set of the plurality of data sets to limit visibility of data stored at the token to a subset of data such that the electronic platform only views data relevant for the data request, wherein the token is stored on an immutable ledger and the token comprises a non-fungible token having metadata corresponding to the relational information.

19. The method of claim 18, wherein each of the plurality of disparate electronic platforms have different communication protocols and the relationships further include:

relationships between the user and other users;

relationships between the user and accounts associated with the user at the plurality of disparate electronic platforms;

relationships between a first electronic platform of the plurality of disparate electronic platforms and a second electronic platform of the plurality of disparate electronic platforms; and relationships between the user and assets stored at the plurality of disparate electronic platforms.

20. The method of claim 18, wherein the token includes a machine learning model configured to create the plurality of data sets and the method further includes:

providing a first set of training data to the machine learning model, the first set of training data training the machine learning model to create the plurality of data sets at a first time interval; and providing a second set of training data to the machine learning model, the second set of training data training the machine learning model to update the plurality of data sets at a second time interval in response to data requirement changes for the token, where the second set of training data causes the machine learning model to change over time between the first time interval and the second time interval such that the token changes over time based on the machine learning model changing over time between the first time interval and the second time interval.

* * * * *